United States Patent [19]

Bauer

[11] Patent Number: 4,523,852
[45] Date of Patent: Jun. 18, 1985

[54] COLOR COMPARISON REFERENCE STANDARD AND METHOD FOR USING SAME

[75] Inventor: Robert Bauer, Bristol, Ind.

[73] Assignee: Miles Laboratories, Inc., Elkhart, Ind.

[21] Appl. No.: 502,462

[22] Filed: Jun. 9, 1983

[51] Int. Cl.³ .............................................. G01J 3/52
[52] U.S. Cl. .................... 356/421; 356/243; 422/55; 434/98
[58] Field of Search .............. 356/421, 422, 423, 424, 356/425, 243; 434/98, 99, 100; 422/55, 56, 57, 58; 436/169

[56] References Cited

U.S. PATENT DOCUMENTS

| | | | |
|---|---|---|---|
| 1,070,891 | 8/1913 | Hochstetter | 356/422 |
| 1,389,836 | 9/1921 | Mooney | 356/415 |
| 1,598,899 | 9/1926 | Vogel | 434/98 |
| 2,074,704 | 3/1937 | Osborne | 356/421 |
| 2,245,557 | 6/1941 | Franzman | 356/422 |
| 2,916,963 | 12/1959 | Bouman | 356/425 |
| 3,438,737 | 4/1969 | Atkinson et al. | 422/56 |
| 3,529,519 | 9/1970 | Mitchell | 356/421 |
| 3,653,771 | 4/1972 | Piringer | 356/422 |
| 3,791,933 | 2/1974 | Moyer et al. | 435/301 |
| 4,160,646 | 7/1979 | Furutani et al. | 422/56 |
| 4,234,313 | 11/1980 | Faulkner | 436/99 |
| 4,330,299 | 5/1982 | Cerami | 436/95 |

Primary Examiner—F. L. Evans
Assistant Examiner—Joel L. Harringa
Attorney, Agent, or Firm—Roger N. Coe

[57] ABSTRACT

An improved method for visually comparing the results of colorimetric analytical tests to a color reference standard, enabling substantially improved quantitation to be achieved for such tests, is disclosed. Also disclosed is improved apparatus, in the form of an improved color comparision reference standard, which is useful in the method. In one embodiment, the standard can comprise a plurality of colored reference areas of differing hues corresponding to discrete reference values and to which a colored response area of a colorimetric analytical test can be compared to determine the reference value most closely related to the hue of the colored response area, and a background area against which the colored reference areas are displayed. The background area has a luminance (L*) value of from about 15 to about 80, and the luminance (L*) value of any portion of the background area is within about 30 of the average luminance (L*) value of any two or more adjacent ones of the colored reference areas which are displayed against the portion of the background area.

13 Claims, 10 Drawing Figures

Error Bars = 1 Std. Deviation

White Background

N = 11

Error Bars = 1 Std. Deviation

Brown Background

N = 11

Error Bars = 1 Std. Deviation

Error Bars = 1 Std. Deviation

COLOR COMPARISON REFERENCE STANDARD AND METHOD FOR USING SAME

BACKGROUND OF THE INVENTION

1. Field of the Invention

This invention relates generally to methods and apparatus for visually distinguishing color values, and particularly to such a method, and apparatus useful therein, for enabling more accurate results to be obtained from visual observation of color responses produced by colorimetric analytical tests such as those used to detect the presence and/or amount of various substances in test samples.

2. Background Art

Many analytical methods and devices are presently available which rely upon a visually detectable response to an analyte in a test sample, such as a color change, as a means for determining, on a semiquantitative or quantitative basis, the presence and/or concentration of an analyte in a test sample. Whether the sample being assayed is a body fluid such as urine, blood, gastrointestinal contents, spinal fluid or the like, or an industrial chemical, waste water, swimming pool water or any of a number of types of media which can be tested to determine various substances therein, it is generally considered necessary that satisfactory visual references be available against which the color or other response produced by the test means can be compared in order to provide a degree of accuracy in quantitation of the reading of the color response of the test used.

Many conventional colorimetric assay methods employ as such references standardized color charts, for visual readings, or standard reference data stored in a reflectance instrument against which the instrument compares readings taken from light reflected from color response areas of the test means which have been exposed to the analyte. In the case of the most convenient test formats now commonly used by clinical assayists—the impregnated fiber matrix, solid phase reagent test strip—the extent of reaction, and hence the concentration of an analyte in a test sample, can be correlated with the intensity, and particularly with the wavelength (hue), of light reflected from the reacted matrix after contact of the sample therewith. To visually assess, quantitatively or semiquantitatively, the amount of analyte present, the color of the reacted matrix is usually compared with predetermined color blocks of differing hues which correspond to various concentration levels of the analyte in the sample.

Thus, visual measurement of the color response of a reacted solid phase reagent test device usually involves comparison and matching of its colored response area with the predetermined colors on a scale of a standard reference chart. Typically, such color charts are made up of a number of discretely hued color blocks, each of which corresponds to a substantially different concentration level of the analyte in a test sample. Ordinarily, the blocks are set against, and surrounded by, a solid white background. By matching the color of the reacted test matrix to that of a particular block or blocks of the chart corresponding to various concentration levels and judged to be most closely related in hue, or by interpolating the matrix color between that of two or more adjacent blocks, the concentration of the analyte can be derived.

Clearly, the accuracy of the visually read results obtained by the foregoing methodology depends on the ease and certainty by which a human observer is able to discriminate between differing, but often closely related, hues of the component color blocks of the chart. Subtle differences in hue of the blocks on such charts often correspond to large quantitative differences in analyte concentration. In order to optimize visual color discrimination, it is apparent that perceived visual differences between the color of adjacent blocks, ideally, should be maximized so that, from a visual standpoint, adjacent blocks which are observed in the same field of vision are as different in hue and intensity of color as possible to the human eye. Unfortunately, because of the reagent systems used in many colorimetric analytical tests, dramatic hue differentiation between adjacent blocks on a color comparison chart is not always feasible, since, in practice, small differences in the hues produced in the reacted test matrix often correspond to very large differences in analyte concentration.

Accordingly, in order to achieve the optimum degree of quantitation available for visual readings of solid phase reagent test devices, the chemical reaction taking place in the test matrix after contact with an analyte in a sample should produce distinctly-colored reaction products, the spectral characteristics of which should vary dramatically with variances in the analyte concentration of the sample. Attempts have been made to achieve this goal to some extent in solid phase devices by using various combinations of different chromogenic reagents in the test device, or by the inclusion of background dyes in the device which interact visually with the product chromophores to achieve a desired effect for a particular analyte concentration level. Traditional solution based wet chemical analytical procedures, while ordinarily capable of somewhat better colorimetric quantitation because the reagents need not be reduced to a solid state and combined in a singular test matrix, nevertheless suffer from the aforedescribed inherent inaccuracies in color perception by human observers, as well as the disadvantages associated with the elaborate equipment and procedures necessary to carry them out.

The best quantitation heretofore available with both solid phase and wet chemical analytical tests has been achieved when the color of the reacted matrix or solution has been measured instrumentally, rather than visually. Obviously, monitoring color changes instrumentally increases the quality of the measurement by removing the subjective component of the visual read process. However, although instrumental methods enable better quantitation, often such methods lack convenience in the field and are expensive in terms of the equipment and materials necessary to carry out the tests. Thus, it has been sought to improve the reading of colorimetric solution tests, and particularly of sold phase reagent tests, in ways such as those previously set forth in order to obtain a degree of quantitation approximating that of instrumental techniques. Making such tests acceptably accurate when visually read not only would help to alleviate the aforementioned problems, but also would make such tests more feasible for very critical uses, for example, when solution or instrumental methods are not available for diagnostic use because of remote field clinical locations or cost, but high accuracy is, nevertheless, a prerequisite. Heretofore, such attempts have fallen short of their mark in terms of enabling very high degrees of quantitation, i.e., excellent correlation with actual amounts of an analyte present in a sample, while at the same time obviating the need for elaborate solution chemistry procedures or instrumentation.

It is believed that the task of providing improved quantitation for visually read, colorimetric analytical tests has not been approached from the standpoint of providing substantial improvements in the color reference standards to which the color responses of such tests are compared. However, the art is replete with scientific literature involving discussions of various phenomena involved in the perception and discrimination of closely related lightness/darkness values of colors, such as the color values typically found in such charts, by the human eye.

Color is generally accepted to be three dimensional, having the characteristics (or color values) of hue, lightness and darkness. The literature seems to suggest that the optimum condition for determining how light (or how dark) colored areas can be achieved by setting them against a background having about the same lightness/darkness value. Likewise, the literature seems to propose that the optimum condition for hue discrimination is when a background hue is made about equal to the hues being viewed against the background. So far as is known, however, no suggestion or disclosure has been made which sets forth a general relationship between the lightness/darkness dimension and the hue dimension, so that slight differences in the latter can be more easily perceived by selection of an appropriately light or dark background against which the hues are viewed, regardless of the actual hues of the colors being viewed.

For example, D. Judd and G. Wyszecki, *Color in Business, Science and Industry*, 3rd ed. (John Wiley and Sons, New York), and particularly pp. 285-7, 292 and 308-9 of this reference, describe and explain certain visual effects, such as the well known "crispening effect", and chromaticity effects involved in the visual discernment of sample grays against gray backgrounds or surrounds (pp. 285-7, 292). Also disclosed by these authors are effects involved in the perceived, comparative chromaticity of adjacent vision fields of slightly differing chromaticity set against a surrounding field having a chromaticity either substantially different from, or nearly the same as, that of the fields being compared (p. 308-9). The "crispening effect" is described in this reference as relating only to gray samples on gray backgrounds, so that only the lightness/darkness dimensions (expressed as V, Munsell Value, or Y, luminescence factor) of the samples and backgrounds are involved. The general relationship derived from this discussion, in terms of lightness/darkness perception of samples against a background, is that for discernment between two nearly matching gray samples, accuracy is increased when the two samples are viewed against a background gray of nearly the same V value as that of the two samples. With respect to color matching or color discrimination, this reference discloses that the foregoing concept can be extended to visual discrimination of colored samples differing only slightly from one another in hue, i.e., the ideal background for distinguishing between two similarly colored samples set against the background is of a hue similar to that of each of the two colored samples.

Therefore, the Judd and Wyszecki reference previously discussed refers to "lightness" as indicative only of the position of a given colored sample on a gray scale running from white to black, with no consideration of the hue or chromaticity of the sample as it relates to the "lightness" parameter. Likewise, the hue characteristics are referred to in this reference as apparently observing similar visual discrimination principles, but independently of "lightness", that is, the background color need only be similar in hue to the two colors being perceived against it for optimum resolution of the actual hue of one color vis-a-vis the other. This work, therefore, does not disclose or suggest any phenomenological relationship between "lightness" of a background and the ability of a human observer to accurately discriminate between colored samples set against it which may differ only slightly in hue, but not "lightness".

Additional literature references discuss topics of relevance to the general areas of color matching and visual color discrimination. These include K. L. Kelly and D. B. Judd, *Color: Universal Language and Dictionary of Names*, National Bureau of Standards Special Publication 440, pp. A10-A12; I. T. Pitt and L. M. Winter, *Effect of surround on perceived saturation*, Journal of the Optical Society of America, Vol. 64, No. 10 (October, 1974), pp. 1328-1331; C. J. Bartleson, *Changes in Color Appearance with Variations in Chromatic Adaptation*, COLOR research and application, Vol. 4, No. 3 (Fall, 1979), pp. 119-138; T. S. Troscianko, *Effect of Subtense and Surround Luminance on the Perception of a Coloured Field*, Ibid., Vol. 2, No. 4 (Winter, 1977), pp. 153-159; and R. W. G. Hunt, *The Specification of Colour Appearance. II. Effects of Changes in Viewing Conditions*, Ibid., Vol. 2, No. 3 (Fall, 1977), pp. 109 et seq.

All of the references cited in the preceding paragraph disclose substantially the same phenomenon: that by altering the luminance, i.e., the intensity or lightness/darkness of a surround, the actual luminance of sample colors set against the surround which have only slightly differing luminance values can be more readily distinguished. The Kelly and Judd reference also describes variable gray backgrounds of standard ISCC-NBS Centroid color charts wherein colored samples are so affixed "that each color is seen on a background of approximately its own lightness" (p. A-10). The general conclusions and mathematical derivations presented in this literature do not suggest any solution to the problem of enhancing visual discernment between very similar actual hues of colored areas by alteration or selection of the luminance (lightness/darkness) of their surround or background.

The patent art in the general area of color matching and discrimination discloses varied approaches to discerning lightness/darkness of colors against backgrounds of various types, but also appears lacking of suggestions as to a solution for the last-mentioned problem. For example, U.S. Pat. No. 1,070,891 to Hochstetter discloses a color comparer where one foreground color is displayed adjacent to another to enable close matching of the colors, rather than providing a background to enable the foreground colors to be more readily determined.

Mooney, U.S. Pat. No. 1,389,836, discloses a colorimeter wherein colors of liquids are measured or compared. The patentee points out, on page 1, column 2, beginning at line 77, that the nature of the background or the area surrounding it affects the ease of an observer's judgments. A background which is white or neutral gray and in light intensity the same as the colors being compared is recommended. However, no detailed discussion of this system of analysis is contained in the patent.

A color card is shown by Osborne, in U.S. Pat. No. 2,074,704. The patentee seeks to bring out the full color or true color by associating or combining the colored sample or area with a black background of dull or light-absorptive finish.

An apparatus for testing used lubricating oils is shown by Franzman, U.S. Pat. No. 2,245,557. The used oil is placed on a dark background which renders the dark color of the oil much lighter in appearance than when placed on a white background. It is said that this enables various shades of dark, used oil to be more easily and quickly differentiated and the degree of variation to be more prominent.

U.S. Pat. No. 2,916,963 to Bouman discloses an apparatus for testing light discrimination, wherein light of different intensities and different color is the basis upon which the discrimination is made. Atkinson et al., U.S. Pat. No. 3,438,737 (assigned to the present assignee) discloses devices for detecting protein in fluids. In column 3, beginning at line 36, there is a discussion of the use of background coloring material in the compositions of the test devices themselves. U.S. Pat. No. 3,653,771 to Piringer discloses a means for color evaluation of a color sample, and U.S. Pat. No. 3,529,519 to Mitchell discloses an apparatus for color adjustment in photographic printing. In the latter, a background surface of neutral gray is provided for comparison purposes.

Moyer et al., U.S. Pat. No. 3,791,933, discloses a method for the rapid assay of enzyme substrates and the like. The test involves comparison between the color developed in a test spot and a conventional color chart. Furutani et al., U.S. Pat. No. 4,160,646, discloses a method for analyzing liquid specimens. The test involves obtaining corrected reflectivities of the test pieces with regard to a reference piece. Faulkner, U.S. Pat. No. 4,234,313, shows a testing composition where a colored indicator loses color in direct proportion to the amount of material being tested that is present. A comparison strip is also used in this system.

U.S. Pat. No. 4,330,299 to Cerami discloses a method for measuring the level of glucose in body fluids by placing a sample of the body fluid in contact with an indicator. A kit is also disclosed having indicator means which provides a color reaction different from that of the remaining color forming materials.

Thus, because of the aforedescribed deficiencies of the art, in developing the instant invention the task was faced of formulating a color reference for visual reading against which the hue responses of colorimetric analytical tests could be compared, and which would achieve substantially improved accuracy in quantitation over any other color reference or color comparison method heretofore known. This task was particularly complicated because most color reference charts commonly used in association with such analytical tests not only have color blocks set upon a white or nearly white background, but also have adjacent color blocks thereupon which differ only slightly in actual hue. Moreover, on most such charts nonadjacent blocks differ somewhat drastically in hue, and often in at least a portion thereof, color blocks (both adjacent and nonadjacent) are of substantially the same luminance, or lightness/darkness value. Thus, the general configuration of many such color charts comprises a substantially solid white paper substrate having printed thereupon a series of solid colored blocks of various hues ranging from light to dark luminance as read from one side of the chart to the other. An indication of corresponding concentrations of an analyte is usually printed upon the chart proximate to each color block.

DEFINITIONS

The following values and terms are used herein, and in the appended claims, as defined in this section.

I. Luminance. Referred to herein also as "luminance value" or "L*", luminance is defined by the following mathematical relationship (D. Judd and G. Wyszecki, *Color in Business Science and Industry*, 3rd edition, John Wiley & Sons. New York):

$$L^* = 25(100Y/Y_o)^{1.66} - 16$$

where Y is a luminance factor consisting of a "percent reflectance" measurement obtained from a scanning reflectance spectrophotometer, and Yo is a luminance factor obtained for a "perfect white" colored area and, therefore, is for practical purposes and in the present disclosure equal to 100.

The factor Y can be obtained, for example, from a colored area by using a scanning reflectance spectrophotometer known as the "Rapid Scanner". For purposes of the instant disclosure, all Y measurements were taken by such a "Rapid Scanner" device interfaced with a laboratory microcomputer which enables rapid measurement of reflectance spectra in the visual range; the computer provides for storage of the spectral data and is programmed to perform computations integrating wavelength data and transforming them into CIE (Commission International de l'EcLairage, Paris, France) tristimulus values (XYZ) and then to the related L*a*b* values according to CIE recommendation No. 2 (C.I.E. recommendations on Uniform Color Spaces, Color Difference Equations and Metric Color Terms in May 1976 Supplement No. 2 to C.I.E. Publication No. 15, Colorimetry E-1.3.1 1971). As defined in this context, L* values describe human "lightness" perception, a* redness-greeness perception and b* yellowness-blueness perception.

The Rapid Scanner instrument was constructed by the Ames Division of Miles Laboratories, Inc., Elkhart, Ind., from whom complete information with respect to structural and performance characteristics is obtainable. See also, M. A. Genshaw and R. W. Rogers, *Anal. Chem.*, Vol. 53, pp. 1949–1952 (1981).

II. Color Difference values ($\Delta E$). Tri-stimulus values, from the Rapid Scanner, as described previously can be used to calculate color difference values ($\Delta E$), or the total difference between two colors given in term of L*a*b*, according to the convention contained within the May, 1976 Supplement No. 2 to CIE Publication No. 15, Colorimetry (E-1.3.1), 1971. The data from the Rapid Scanner instrument can, therefore, be recorded conveniently in terms of $\Delta E$, or color difference units, which correlate closely with differences in actual hue (a*, b* values) between two colors being measured by the instrument.

III. Hue. Referred to herein also as "wavelength", hue is defined as the visually observable wavelength component of color produced by reflected incident light from an object, and is independent from "luminance" or "lightness/darkness".

SUMMARY OF THE INVENTION

It has now been discovered, and the present invention is based upon this discovery, that two or more colored areas differing in actual hue can be more accurately, quickly and easily visually compared with and/or distinguished from one another, by displaying or setting them against a background area having a particular luminance value within a range determined by the averaged luminance values of the colored areas, regardless of the hues of the colored areas or of the background.

Accordingly, the present invention, in particular, provides an improved method for visually comparing the results of colorimetric test means, such as analytical tests, to a color reference standard, enabling substantially improved quantitation to be achieved for such tests. The present invention also provides improved apparatus, in the form of an improved color comparison reference standard, which is useful in the method. In one embodiment, the standard can comprise a plurality of colored reference areas of differing hues corresponding to discrete reference values and to which a colored response area of a colorimetric analytical test can be compared to determine the reference value most closely related to the hue of the colored response area, and a background area against which the colored reference areas are displayed. In this embodiment, the background area has a luminance (L*) value of from about 15 to about 80, and the luminance (L*) value of any portion of the background area is within about 30 of the average luminance (L*) value of any two or more adjacent ones of the colored reference areas which are set against the portion of the background area.

DETAILED DESCRIPTION OF THE INVENTION

Figure 1:
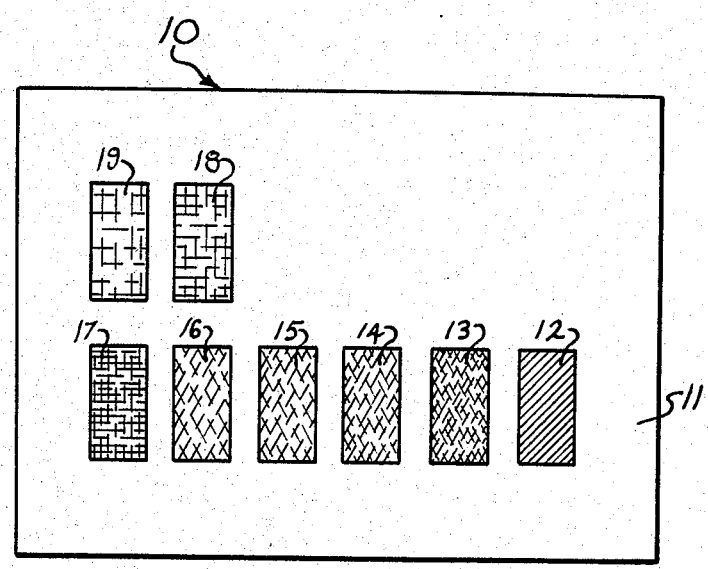
FIG. 1 is a top plan view of a largely conventional color comparison reference chart for a colorimetric analytical test, as typically found in the prior art.

During development of the present invention, it was found that small observable differences in perceived luminance, or "lightness/darkness" between the color response areas of commonly used, solid phase reagent test strip devices (for example, those typically employed for determining glucose in urine and blood, such as are marketed by the Ames Division of Miles Laboratories, Inc., Elkhart, IN 46515, under the trademarks DIASTIX® and VISIDEX™, respectively), visually could be more easily distinguished if the response areas, during observation, were displayed or set against a background area which was other than substantially white (L* of about 90–100).

Accordingly, it was thought that this finding, which appeared to agree with the disclosures of the literature discussed supra, might be utilized to advantage in the design of standard reference charts having "blocks", or areas of color corresponding to various quantitative levels of an analyte in a test sample. However, upon further experimentation it was discovered that perceived hue differences were not substantially improved merely be changing the background to other than white, but could most accurately be discerned between the color blocks, and between the blocks and the response areas of the strip devices when displayed against the background and adjacent to the blocks, when the background had certain luminance (L*) characteristics, as disclosed and claimed herein, regardless of the hue thereof, or the actual hues of the color blocks. It was found that, due to this discovery, extremely accurate comparisons could be made of the color developed in the test device to the block or blocks which had colors most nearly corresponding to that of the device, enabling the amount of analyte in a sample to be much more accurately determined. Thus, the objective of the experimentation undertaken to develop the present invention, and the objective achieved thereby, was substantially improved quantitation for visual readings of colorimetric analytical tests, by an improved apparatus, and method, which enable human observers to more easily distinguish between relatively small differences in the wavelength, or hue, between color blocks of a standard reference chart, and between such color blocks and the color of reacted color response areas of analytical tests used in connection therewith.

According to the instant invention, therefore, it has surprisingly been found that otherwise conventional colored areas, or blocks of color on standard color reference charts for colorimetric analytical tests, can be displayed against background areas which are other than substantially white or substantially black, and which have particular luminance values, with a dramatic improvement in quantitation resultant from the visual reading of such tests. Moreover, the ease and speed of reading of such tests has been found to be greatly improved over similar readings taken from conventional color comparison charts, because of the apparently increased ability of human observers to more readily distinguish between small hue differences between the color blocks of the chart. In particular, it has been found in experimental studies involving direct visual read comparisons, using human observers of substantially normal color perception, that color comparison charts according to the invention which had a background luminance, or $L^*$ as previously defined, of from about 15 to about 80, and a plurality of color blocks of varying hues displayed thereagainst, any two or more adjacent ones of such blocks having an average luminance within about 30 luminance ($L^*$) units of the portions of the background against which they are displayed, unexpectedly enabled the observers to more accurately match the hue responses of conventional colorimetric analytical tests with the hues of the color blocks of the chart, by comparison with similar matches obtained by the same observers using a largely conventional color chart. Moreover, the principles and teachings of the presently disclosed invention can be applied to the improvement of techniques for instrumental or optical comparison of colors, or any other color matching techniques, such as in coating technology or other fields where precise correlation of hues is necessary and/or desirable.

Although the enhanced ability of an observer to more easily, and accurately, perceive true hues of the color response areas of colorimetric tests by utilization of apparatus embodying the principles of the present invention is, at present, a phenomenon believed to involve largely unknown psychophysiological parameters of human vision characteristics, general lessons have been learned by fabrication and application of embodiments of the present invention. For example, it has been found that the effect produced is most apparent, i.e., improved hue perception is most enabled, when the luminance of the background is very similar to that of the average luminance of the colors being compared against it, within the observer's field of vision. Thus, according to one preferred embodiment of the invention, each portion of the background has a luminance ($L^*$) value of from about 15 to about 80, which, for example, if the overall hue of the background is grayish, can comprise a color gradient ranging from a very light, unsaturated gray to a very dark, heavily saturated gray. Correspondingly, in this preferred embodiment, the luminance of each portion of the background of any two or more adjacent color blocks being compared to one another, or being compared to the color response produced by an analytical test, in accordance with the invention has an average luminance ($L^*$) value within about 30 $L^*$ units of that of the average of the adjacent color blocks. Preferably, however, the luminescence value of each background portion is within about 20 $L^*$ units of the average of the color blocks compared, and most desirably, within about 10 $L^*$ units thereof. The most dramatic improvement, in terms of the ability of human observers to discern very subtle differences in color block hues and, therefore, to more accurately match the hue of an analytical test to an appropriate color block, has been noted for preferred embodiments of the invention having the latter features, i.e., wherein the background is at least within 20, or within 10, $L^*$ units of the color block average luminance.

It is to be appreciated that the unexpectedly advantageous visual effect produced by the invention, which enables visual distinctions to be more readily and easily made between color hues set against a background area, appears to be substantially independent of the actual hue of the background area, also independent of the actual hues of the colors displayed thereagainst, and to be solely dependent upon selection of background lightness/darkness value (luminance). Moreover, the advantageous effect produced by use of the invention appears to be substantially independent of the quality or value of the incident light under which embodiments of the invention are viewed, and so long as an observer possesses substantially normal color vision, also largely independent of human vision characteristics.

This surprising discovery, that two or more adjacent, closely related hues, regardless of the actual wavelengths thereof, can be more easily distinguished by selection of an appropriate background luminance having a value within a certain range of the average luminance of the adjacent hues which are displayed thereagainst, is indeed a novel finding, and the practical application of this phenomenon as described herein is believed to be totally unsuggested by any color matching technique heretofore known, whether in the art of colorimetric analytical standards, or in any other field.

Additionally, so far as is known, no generally valid, quantifiable relationship between background color luminance and "foreground" color luminance values has, heretofore, been proposed which might provide a means by which one of skill in the art could formulate an optimum color comparison reference for a given colorimetric analytical test. The present invention advantageously provides such a relationship by which such references can be made and used, but is not limited in this applicability. Thus, while the description herein presents embodiments of the present invention in terms of improving the accuracy and quantitation of colorimetric analytical tests, the principles and teachings of the invention may find applicability in such diverse fields as photography, paint and color matching, graphic arts, advertising, and any other field where enhanced visual perception of the actual hues of closely related colors may be necessary or desirable.

Heretofore, as previously described, the problems and inaccuracies associated with visual discrimination of colors on reference charts for colorimetric analytical tests have been addressed largely by the use of instrumental techniques for reading the responses obtained from the test devices, or by attempts to modify the hue responses of the test devices themselves by the inclusion therein of background dyes or the like. It is to be appreciated, however, that the present invention departs from these techniques and provides advantageously enhanced quantitation for conventional colorimetric analytical tests without the necessity for the use of instrumental methods or modification of the hue of the test response. This result is enabled by the invention in a color chart for an analytical test by selection of a background luminance value, for the color blocks of a reference standard, having a luminance of from about 15 to about 80 L* units. Thus, a background can be selected which has an L* of around 20–30, to distinguish easily between subtle color block hues of very dark luminance, whereas if the colors being compared are very light and thus of much higher luminance values a comparatively light background can be selected, having an L*, for example, of from about 70–80.

As previously stated, in an especially preferred embodiment of the invention, color chart hue resolution between two or more adjacent color blocks and between an analytical device and color blocks closely related in hue thereto has been greatly aided when a gradient background (in terms of luminance value) is used which varies continuously from light to dark. Such a preferred color comparison reference standard can comprise, for example, a color chart having a background gray against which the color block scale of the chart is displayed and which begins at about the same luminance as, e.g., light shades of adjacent yellow, green and orange blocks on one end of the chart, and continues to darken continuously such that the background luminance of the gray surrounding any two or more adjacent color blocks on the scale is within about 20, or less, L* units of the average luminance of any adjacent blocks, even though the remaining end of the chart displays substantially darker color blocks.

Since the luminance, or amount of lightness/darkness of the background area, is the key factor in the present invention, simple gray gradients, or a solid gray background, can be suitably employed in the instant invention, regardless of the actual hues of the colored comparison areas displayed against the background. Likewise, suitable backgrounds can range, for example, in intensity and hue from light to dark green, light to dark blue, and light to dark brown. In addition, many other suitable color varients can be conceived by one of ordinary skill and used in the invention. Because the luminance, not the hue, of the background plays a critical part in the present invention, virtually any hue can be selected as desired for the background color so long as the luminance thereof is within the range of values herein specified.

It will likewise also be appreciated that backgrounds of lighter or darker luminance than within about 30 luminance (L*) units of the average luminance of adjacent colored areas which are displayed thereagainst are outside the scope of the presently disclosed invention, and can thus result in substantially diminished ability of human observers to distinguish subtle differences in the hue of the colored areas, offering no advantage over otherwise conventional color charts and methods.

Referring now in more detail to FIG. 1 of the Drawings, a typical prior art color comparison reference standard, comprising a color chart for a colorimetric analytical test for glucose in urine, is indicated generally at 10. The chart 10 is of a type typically used for making semiquantitative and quantitative comparisons of color developed in the solid phase reagent matrix of a test strip device for determining the presence and/or amount of glucose in urine. The chart 10 comprises a substantially solid white background area 11, for example of printed paper having an L* value of approximately 95, and a plurality of color blocks also printed upon the paper, as indicated by reference numerals 12 through 19. The paper substrate upon which the background area 11 and color blocks 12 through 19 are printed is of a conventional type for pharmaceutical labelling and has an adhesive backing, of conventional design, for adhering the chart 10 to a container for the analytical test devices. The color blocks 12 through 19 are of various hues ranging from dark reddish brown (12) to medium yellow (19); adjacent ones of the blocks (e.g., 12 and 13; 13 and 14; 18 and 19; 17, 18 and 19) differ only slightly from one another in actual hue, so that the hue difference between any two or more adjacent ones thereof can be represented by a calculated $\Delta E$ value ranging from approximately four (4) to twenty-three (23). Thus, as shown, the block 13 is slightly more red in coloration than is the block 12 ($\Delta E = 7.2$); the block 14 is slightly more red than 13 ($\Delta E = 8.3$); the block 15 is slightly less red but somewhat more yellow and orange than 14 ($\Delta E = 4.2$); the block 16 is a little less red than 15 and is a slightly truer orange ($\Delta E = 19.6$); the block 17 is slightly less red than 16 and has somewhat more yellow ($\Delta E = 16.8$); and the block 18 is a medium orange-yellow and differs only slightly in hue from the most closely adjacent blocks, 17 and 19, which have hue variances of orange and yellow ($\Delta E = 22.8$ and 14.3 respectively). The blocks 12 through 19, as illustrated, are generally rectangular in shape and are situated so that each is surrounded by and displayed against a portion of the background area 11.

Referring again to FIG. 1, the luminance (L*) values of the respective color blocks 12 through 19 are, beginning with the block 12: 38.5, 41.1, 43.0, 46.2, 47.9, 59.1, 69.0 and 76.0.

Although the color blocks 12 through 19 of the conventional color standard chart of FIG. 1, as described supra, differ only slightly in actual hue, each corresponds to a clinically significant difference in the concentration of glucose present in a urine sample, as would be indicated by matching the color thereof to the corresponding color of the reacted matrix of the aforementioned test device. For example, in FIG. 1, for this typical urinary glucose test the block 12 corresponds to a glucose level, or reference value, of 5000 or more milligrams per deciliter (mg/dl) of glucose, the block 13 to 2000 mg/dl, and the blocks 14, 15, 16, 17, 18 and 19 to glucose concentration levels (reference values) of 1000, 500, 250, 100, 30 and 0 (negative), respectively.

Figure 2:
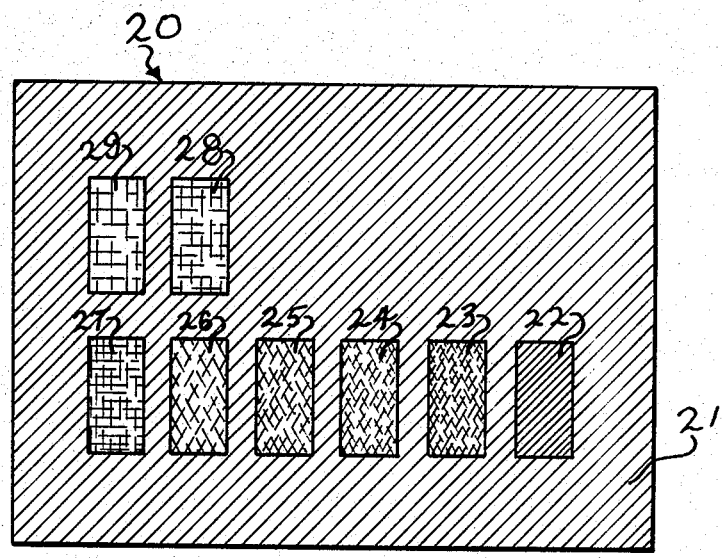
FIG. 2 is a top plan view of a color comparison reference chart for a colorimetric analytical test, in accordance with one embodiment of the present invention.

Referring now to FIG. 2, a color comparison reference standard comprising a color chart in accordance with a preferred embodiment of the present invention is indicated generally at 20. The chart 20, similarly to the conventional chart 10 of FIG. 1, in the particular form illustrated comprises a paper substrate having an adhesive backing and is useful as a reference standard for comparing color responses thereto obtained from the reacted test matrix of a solid phase analytical device for determining glucose in urine. Thus, the chart 20 is substantially identical to the chart 10 in most respects except that it comprises a printed background area 21 of a substantially solid, medium brown hue (wavelength of 480 nanometers), luminance (L*) value of 47.0, rather than a substantially solid white background having a luminance (L*) value of about 95. Printed color blocks 22 through 29, inclusive, which are surrounded by and displayed against a portion of the background area 21, are identically shaped and situated against the background area 21 as in the chart 10 of FIG. 1. The color blocks 22 through 29, moreover, are of substantially identical hue and luminance as the blocks 12 through 19, respectively, of FIG. 1. However, the background luminance (L*) of the area 21, with respect to portions thereof which surround any two or more adjacent ones of the blocks 22 through 29 displayed thereagainst, unlike the conventional chart 10 of FIG. 1 is within 30 luminance (L*) units of the average luminance (L*) of any adjacent ones of the blocks 22 through 29. The blocks 22 through 29 also correspond to like concentration levels (reference values) of glucose in urine, as described in FIG. 1.

Figure 3:
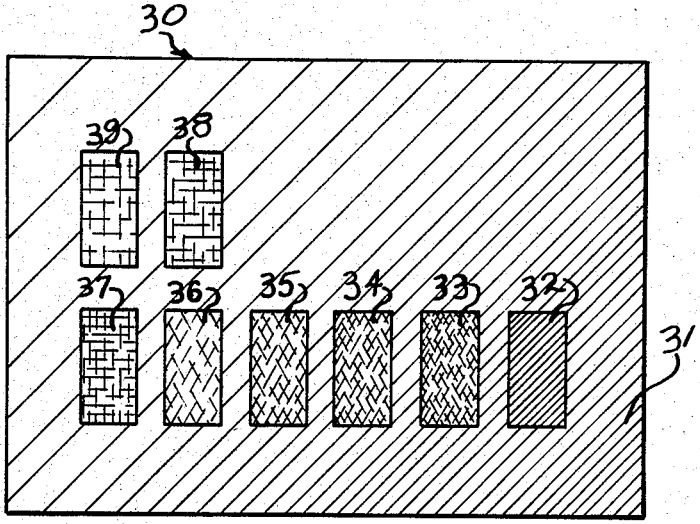
FIG. 3 is a top plan view of a color comparison reference chart for a colorimetric analytical test, in accordance with a second embodiment of the invention.

Referring to FIG. 3 of the drawings, another preferred embodiment of the present invention is indicated generally at 30. The color comparison reference chart 30 comprises a paper substrate having an adhesive backing and a printed background area 31 surrounding printed color blocks 32 through 39. The blocks 32 through 39, inclusive, are of substantially identical shape, hue and luminance (L*) as the blocks 22 through 29, respectively, of FIG. 2, and are situated virtually identically on the chart 30. However, unlike the background area 21 of FIG. 2, the background area 31 comprises a printed gradient of gray coloration, which, when viewed from the left side of the chart 30 to the right side thereof, ranges from a light medium gray to a dark medium gray, luminance (L*) value of from about 70 to about 30. Moreover, as viewed from left to right, the luminance of the background 31 at any point surrounding any two or more adjacent ones of the blocks 32 through 39 which are displayed thereagainst is within about ten (10) L* units of the average luminance (L*) value of the adjacent blocks. The blocks 32 through 39, moreover correspond to the same concentrations of glucose in urine as the blocks 22 through 29 of FIG. 2.

Figure 4:
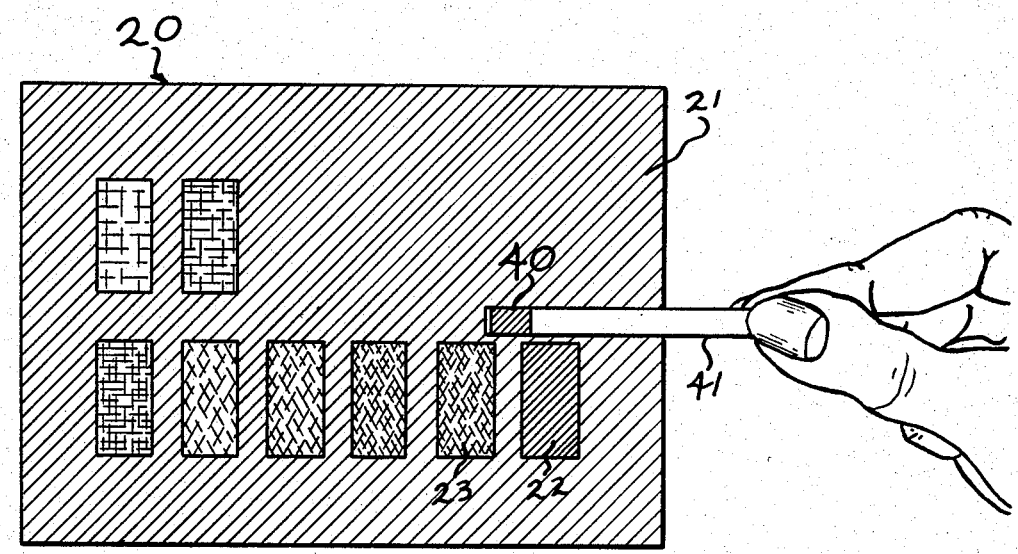
FIG. 4 is a top plan view of the color comparison reference chart according to the invention as shown in FIG. 2, and further showing use of the chart for comparison of the color response of a typical colorimetric analytical test device thereto.

Referring now to FIG. 4 of the drawings, the color chart 20 of FIG. 2 is shown in use as a color reference standard for a solid phase, analytical reagent strip test for glucose in urine. A reacted test matrix, color response area 40 of a reagent strip 41 is shown displayed adjacent two or more of the color block areas 22 through 29 (shown adjacent blocks 22 and 23); the strip 41 is so placed that the color response area 40 is displayed against the background 21 and is observed in the same field of an observer's vision as adjacent blocks 22 and 23. Thus, in use of this embodiment of the invention, the response area 40 is placed adjacent whichever one(s) of the blocks 22 through 29 appear to be most closely related in hue thereto and the concentration of glucose present in the urine sample being analyzed is determined or interpolated from the concentration (reference) value corresponding to the block or blocks in the observer's field of vision which are most closely related in hue, in the judgement of the observer. This method of use, while the present invention is not restricted thereto, has been found to be particularly advantageous for enabling greatly enhanced accuracy in quantitation of visual readings, since it has been determined that a colored test matrix can be more accurately compared and matched with adjacent color blocks which are most closely related in hue and, as between those color blocks, with the one block most closely matching in hue, provided that the matrix and the closely related color block(s) to which it is adjacent are against a background, as shown at 21 of FIGS. 2 and 4, which has a luminance (L*) of within about 30 L* units of the average L* value of the adjacent color blocks. The dramatic improvement in enhanced quantitation for such colorimetric analytical tests which is afforded by the present invention becomes most apparent when the quantitative readings obtained by visually reading such tests against conventional color reference charts, as illustrated in FIG. 1, are compared with readings obtained against charts according to the invention, such as illustrated in FIGS. 2, 3 and 4, as described in more detail infra.

In fabrication of color charts of the invention, such as those illustrated in FIGS. 2 through 4 of the drawings, a piece of paper or other suitable substrate material can be coated or printed with colored inks using conventional techniques such as silk screening or lithography, or other suitable substances can be used to form the background and colored areas which are displayed or set against it. As earlier mentioned such a two dimensional paper chart can be provided also with a suitable adhesive backing so that it can be conveniently adhered to a bottle or other container or packaging for a colorimetric test means.

The invention, however, is not intended to be limited to a color chart such as the particular embodiments described herein which are suitable for use with typical colorimetric tests used for determining substances in sample fluids and the like. Other embodiments of the invention can comprise, for example, colored cardboard, wood, metal, plastic or any other material which can be suitably colored to form a background, which, printed upon, mounted to or otherwise affixed thereto are displayed a plurality of colored areas of varying hues for viewing against the background. Alternatively, a color chart according to the invention can comprise a series of colored, fluid filled vials, or other colored media of various sizes or shapes mounted suitably so as to be displayed against a background having the appropriate luminance value(s). Accordingly, it can be seen that the present invention is in no way limited to the specific embodiments shown in the drawings and described herein, but that the principles and advantageous features of the invention can be applied to many different forms of color comparison apparatus suited for various purposes.

EXAMPLES

Example I

In order to more fully point out and describe the advantages of the present invention, in terms of enhanced quantitation for visually read colorimetric analytical tests, studies were conducted wherein embodiments of color charts prepared according to the invention were viewed by human observers and utilized to obtain quantitative readings from typical ones of such colorimetric tests, for comparison to similar readings obtained from color charts of largely conventional construction. The observers were selected from persons having no known color vision deficiencies.

The charts which were prepared were of paper construction having printed thereupon a solid background color and a plurality of color blocks of differing hues, surrounded and separated one from another by the background. The charts, in hue, appearance, shape and arrangement of the color blocks, were substantially the same as those illustrated in FIGS. 1 and 2 of the Drawings and described herein in connection therewith. Adjacent ones of the color blocks on each chart thus differed only slightly in hue from one another on each chart, but were identical in hue as between charts, and corresponded to color responses, i.e. hues, which could be expected to be produced in the color area(s) of a solid phase reagent strip test for determining glucose in urine. Specifically, each color block corresponded to glucose levels in urine of 0 (negative), 30, 100, 250, 500, 1000, 2000 and 5000 mg/dl, arranged as previously illustrated and described.

The background hues which were printed on the paper were a substantially solid white ($L^* = 94.7$) for the largely conventional chart (FIG. 1) and a medium brown ($L^* = 47.0$) for the chart prepared according to the invention (FIG. 2). On each chart, the $L^*$ values of the color blocks, beginning with the 0 (negative) mg/dl block and ending with the 5000 mg/dl block, were 76.0, 69.0, 59.1, 47.9, 46.2, 43.0, 41.1, and 38.5. Moreover, the $L^*$ value, 47.0, of the background of the chart of the invention was at all points on the chart within about 30 $L^*$ units of the average $L^*$ value of any two or more adjacent color blocks.

All observer readings obtained from the studies described herein were taken under "warm white" fluorescent lamps, commercially available from General Electric Company, which approximate daylight lighting.

Figure 5:
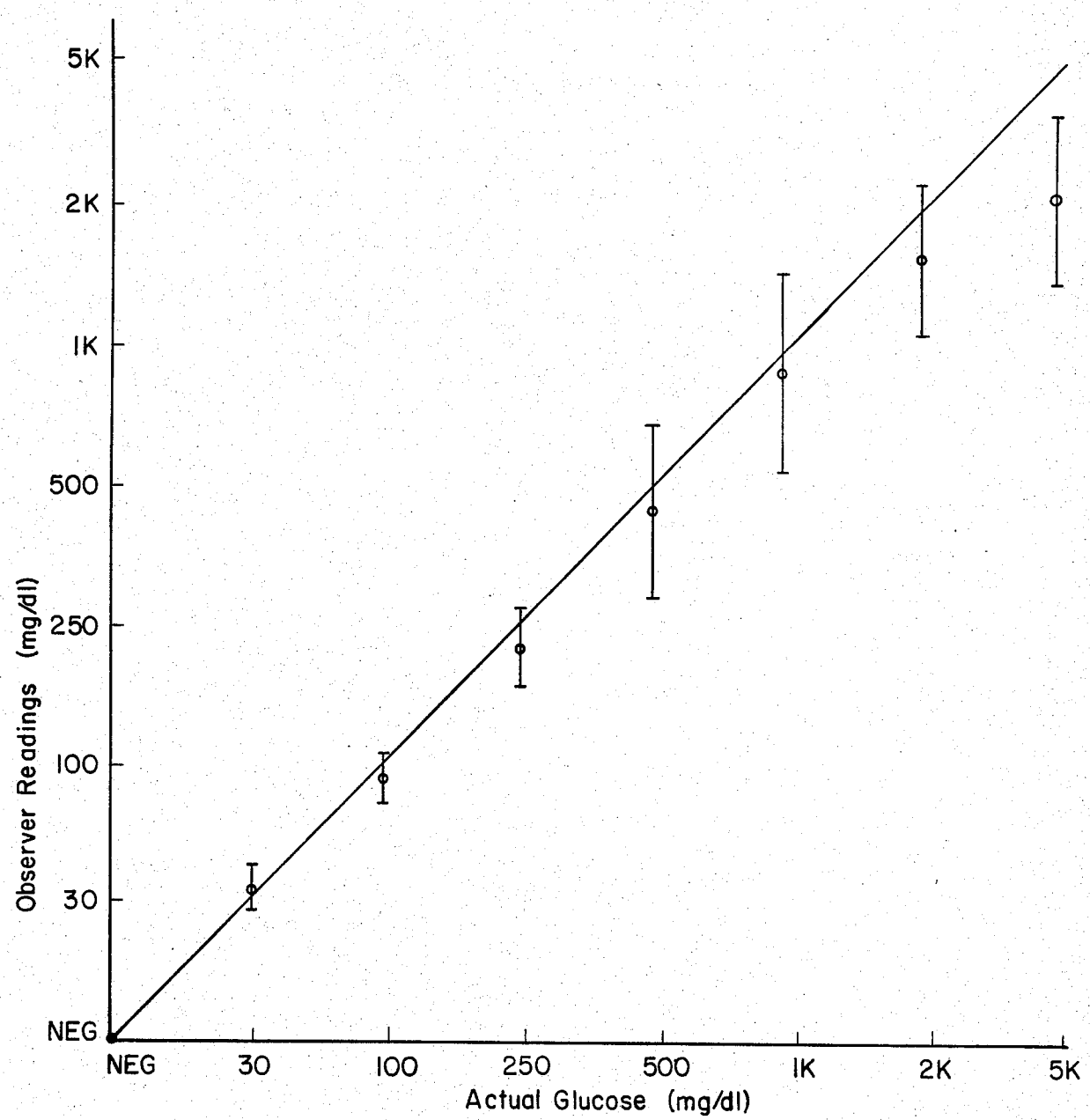
FIG. 5 is a graphical representation of the results obtained from human observer studies when a largely conventional color comparison reference chart, as shown in FIG. 1, was used to obtain comparative visual readings of hues of color responses produced by a colorimetric test for glucose in urine and corresponding to quantitative concentration values.
Figure 6:
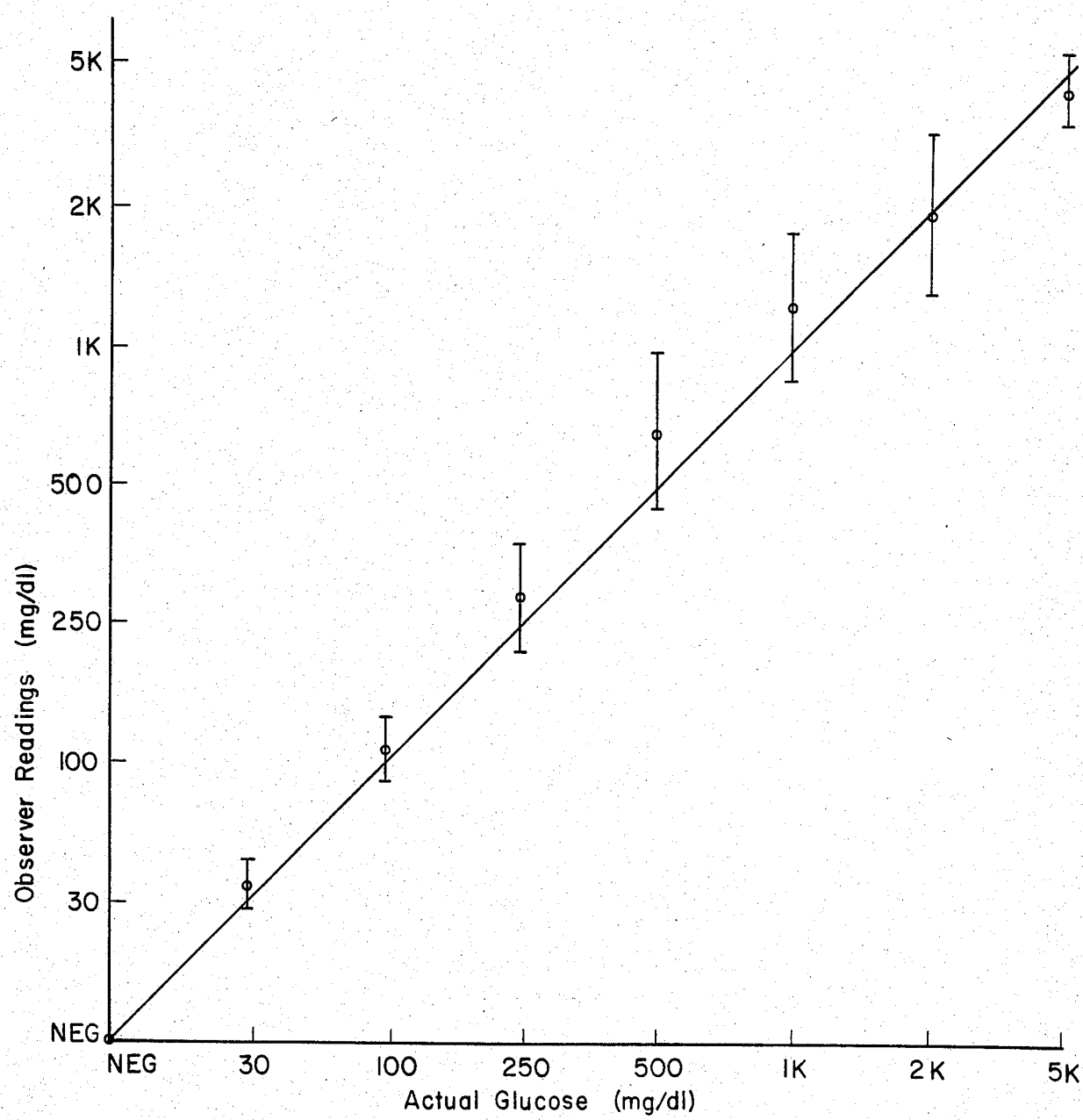
FIG. 6 is a graphical representation of the results obtained from human observer studies when a color comparison reference chart in accordance with the invention, as shown in FIGS. 2 and 4, was used to obtain comparative visual readings of hues of color responses produced by a colorimetric test for glucose in urine and corresponding to quantitative concentration values.

The results of one such set of studies are presented graphically in FIGS. 5 and 6 of the drawings, wherein the vertical axis represents reported color block values by the observers corresponding to visually-read hues of blocks and the test device response area judged to be most closely related in hue to the indicated glucose concentration values, and the horizontal axis represents the predetermined, actual glucose concentration level of each sample tested corresponding to a color block hue. The line intersecting the axis thus represents perfect correlation of observer readings with the actual sample glucose concentrations. The vertical bars shown represent one (1) calculated standard deviation of the readings taken. The "K" subsequent to a number representing a glucose concentration level indicates that the number is to be multiplied by 1000 (e.g., 1K=1000 mg/dl glucose).

Accordingly, solid phase reagent strip test devices for urinary glucose were used to obtain color responses from urine samples previously determined to contain 0 (negative), 30, 100, 250, 500, 1000, 2000 and 5000 mg/dl of glucose. The glucose-containing urine samples were randomized and twenty-seven (27) observers having substantially normal color vision immersed the color-response matrix area of a set of the glucose test strips in each urine, removed the strips and compared the color developed in the matrix of each strip to the most closely corresponding color blocks, in terms of hue, of the conventional color comparison reference chart for the test, as shown in FIG. 1, which had a substantially solid white background. The method of use of the chart and of comparison was substantially as previously described in connection with FIG. 4, each color block corresponding to each level of glucose.

The observers immersed a second set of the same test strips in the same series of urine samples, removed the strips and compared the color responses thereof to the color chart which had been prepared according to the present invention, i.e., which was substantially identical to that shown in FIG. 2, having a medium brown background ($L^* = 47.0$), and each color block corresponding to each level of glucose. Again, the method of comparison and use was substantially as shown and described with respect to FIG. 4.

The observers thus obtained visual readings for each of the test strips from each type of chart, which, on the basis of visual comparison of the strip response hue to the hues on the charts, were judged by them quantitatively to best represent the concentration of glucose in each urine sample.

As shown in FIGS. 5 and 6, differences in the quantitative readings from the test strips were produced by the same observers, depending on which chart was used. As shown in FIG. 6, the readings obtained using the color chart of the invention provided more accurate quantitative values for urinary glucose concentrations; the readings were closer to the perfect correlation line than readings similarly made using the conventional chart (FIG. 5). Moreover, the chart of the invention enabled substantially improved distinction between hues of the color blocks of the 2000 mg/dl and 5000 mg/dl glucose levels, and at one standard deviation (represented by the vertical bars), no overlap in the readings at the 2000 and 5000 mg/dl levels was obtained (in contrast to the data obtained, as shown in FIG. 5, with the chart having the conventional white background). The results of this study, therefore, show the high degree of accuracy of hue matching (and thus the greatly enhanced quantitation) made possible by the invention, enabling observers to more readily match actual hues of colors which correspond more closely to concentrations of an analyte in a test sample.

Example II

Figure 7:
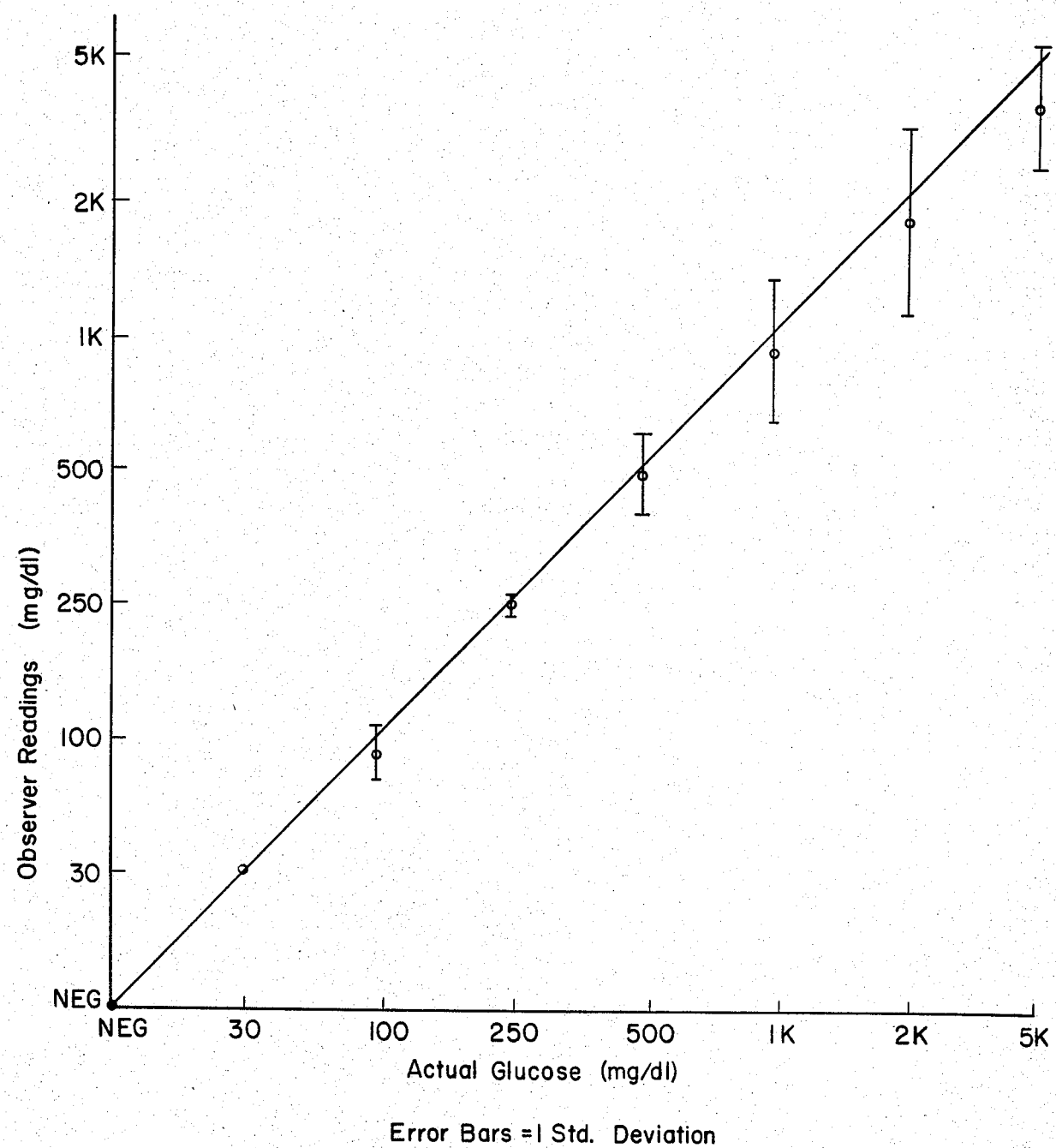
FIG. 7 is another graphical representation of the results obtained from additional human observer studies when a largely conventional color comparison reference chart, as shown in FIG. 1, was used to obtain comparative visual readings of hues of color responses produced by a colorimetric test for glucose in urine and corresponding to quantitative concentration values.
Figure 8:
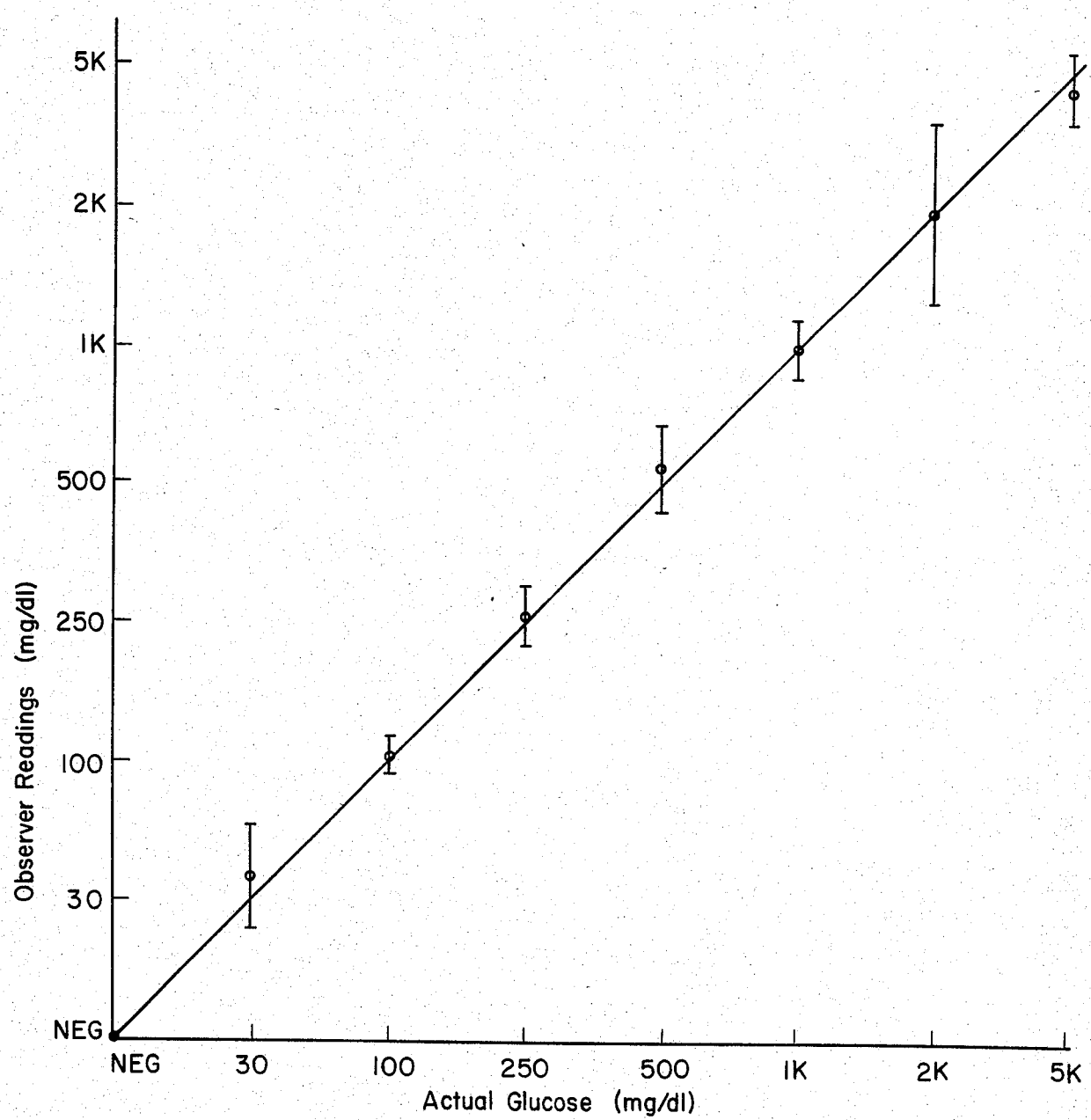
FIG. 8 is another graphical representation of the results obtained from additional human observer studies when a color comparison reference chart in accordance with the invention, as shown in FIGS. 2 and 4, was used to obtain comparative visual readings of hues of color responses produced by a colorimetric test for glucose in urine and corresponding to quantitative concentration values.

Additional studies were carried out, substantially as previously described in Example I, using substantially similar color charts and human observers, to further demonstrate the advantages of the invention over conventional color comparison apparatus and techniques. Eleven (11) observers were used in these further studies rather than the twenty-seven (27) of Example I. The results of this study are presented graphically in FIGS. 7 and 8, wherein it can be seen that, as in the Example I study, quantitation of visual readings of the test devices against the color chart of the invention (FIG. 8) was enhanced over readings similarly taken against the conventional, white background color chart (FIG. 7).

Example III

Additional observer studies were carried out, substantially as described in the previous Examples. However, while the chart according to the invention which was used in this study was substantially identical to those described as used in Examples I and II, and illustrated in FIG. 2, the conventional chart to which its performance was compared was one having a substantially solid white background but foreground colors ranging in hue from medium yellow to dark blue. This prior art chart was one designed as a standard color chart for a commercially available colorimetric test device for glucose in urine (Chemstrip uG, commercially available from Boehringer Mannheim Corporation) wherein the predominant hues produced by the device are shades of blue and green, and correspond to color blocks of the chart representing glucose concentrations of 0, 100, 250, 500, 1000, 2000, 3000 and 5000 mg/dl. Urine samples containing glucose were tested and observation of the test device color responses was accomplished against each of the charts, in a manner substantially identical to that previously described in Examples I and II.

Figure 9:
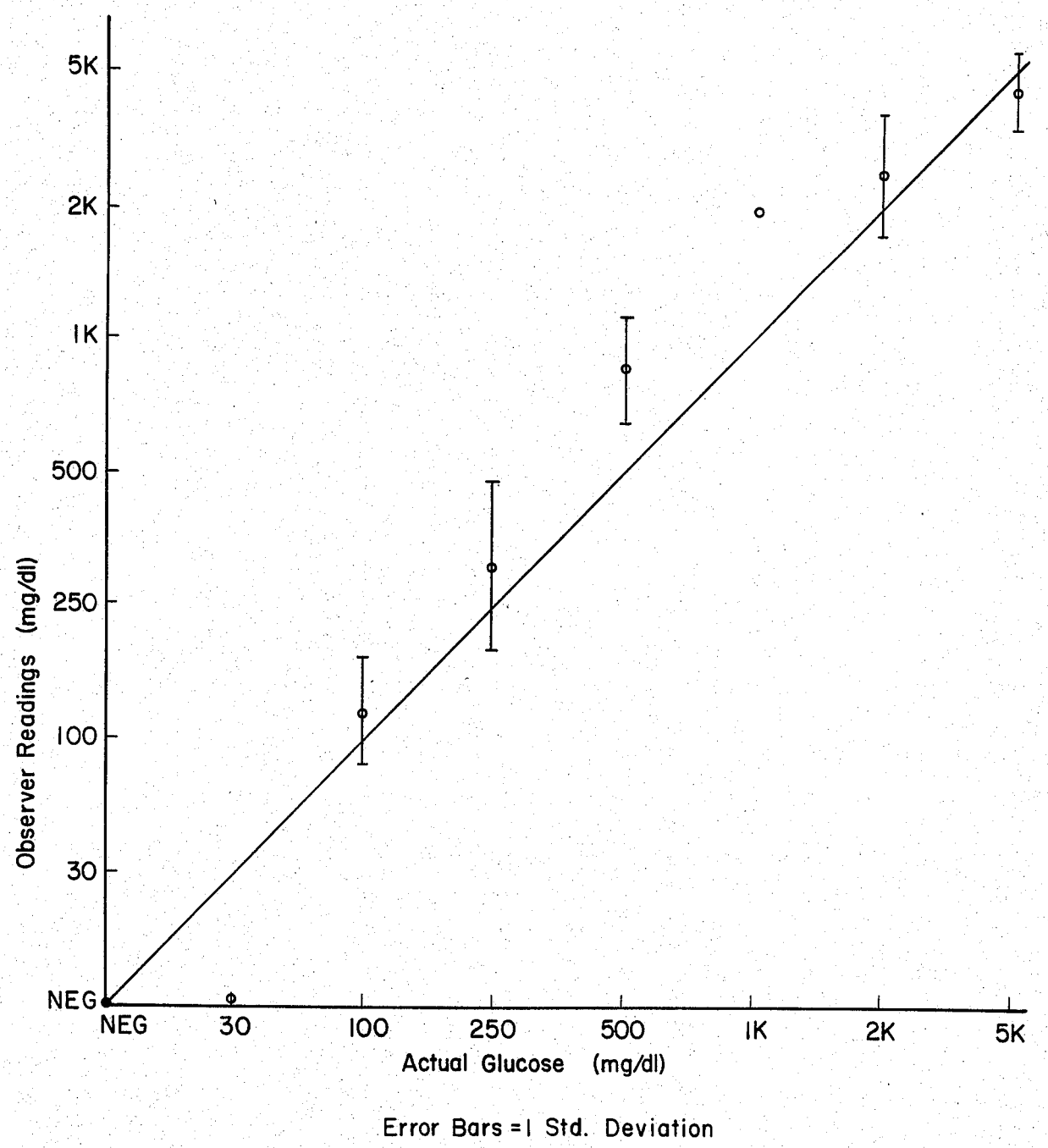
FIG. 9 is a graphical representation of the results obtained from additional human observer studies when another largely conventional color comparison reference chart was used to obtain comparative visual readings of hues of color responses produced by a largely conventional colorimetric test for glucose in urine and corresponding to quantitative concentration values.
Figure 10:
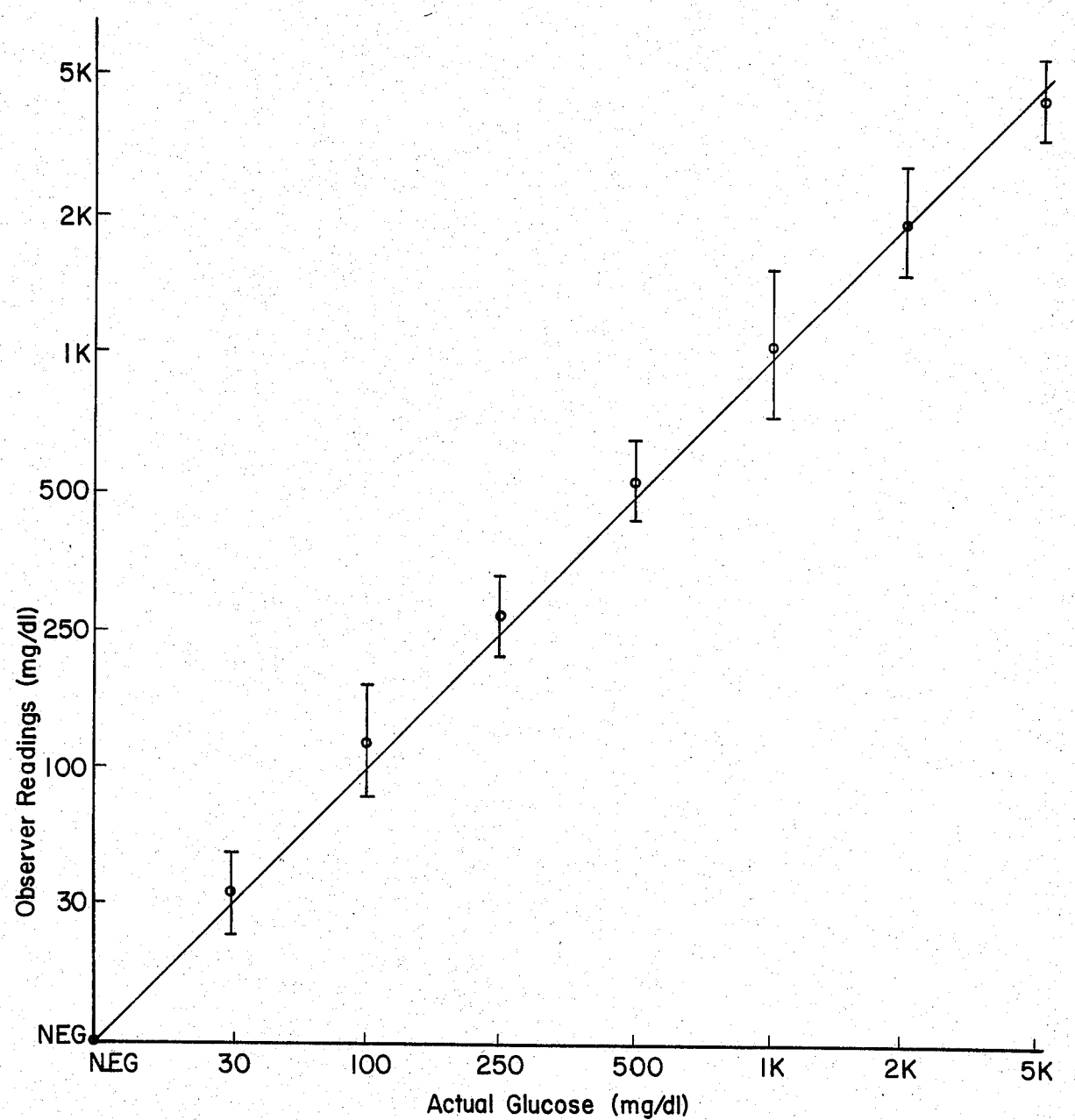
FIG. 10 is yet another graphical representation of the results obtained from still further human observer studies when a color comparison reference chart in accordance with the invention, as shown in FIGS. 2 and 4, was used to obtain comparative visual readings of hues of color responses produced by a colorimetric test for glucose in urine and corresponding to quantitative concentration values.

As can be seen from FIGS. 9 and 10 of the Drawings, which are graphical representations of the results of this study, agreement between the quantitative readings obtained by the observers and the actual glucose concentrations of the urine samples was much greater for the readings taken from the chart prepared according to the invention (FIG. 10), by comparison with the conventional color chart (FIG. 9). These results serve to further illustrate the unexpectedly advantageous effect of enhanced visual discrimination in hue perception, and quantitation of results, achievable through use of embodiments of the invention.

Example IV

In order to further confirm the advantages of the present invention over conventional color charting apparatus and color comparison methods, several pairs of colored papers of subtle hues which were difficult to distinguish from one another, visually, were selected from a standard color book. The color pairs varied in hue from near white ($L^*=94.7$) to near black ($L^*=19.4$). Six gray colored papers, ranging also from near white to near black, were selected to serve as backgrounds against which the color pairs could be viewed. The colored pairs were then mounted on strips of flexible plastic.

Eighteen (18) observers were selected and asked, for each particular colored pair, to select the background gray which, with the colored pair displayed against it, enabled them to most easily distinguish between the two "strip" colors of the pair.

The background papers used and their corresponding $L^*$ values were as follows:

| Paper | $L^*$ |
| --- | --- |
| White | 94.7 |
| very lt. Gray | 80.0 |
| lt. Gray | 66.0 |
| med. Gray | 41.0 |
| dk. Gray | 30.8 |
| Black | 19.4 |

The color pairs (in strip format) had the following average $L^*$ values. $\Delta E$ values between the pairs are shown to provide some concept of how easily the hues of the pairs should be distinguishable. One $\Delta E$ unit of (hue) difference has been determined to be the minimum that the average human eye can discern. Five (5) $\Delta E$ unit differences between colors are detectable, but the perceived hues are quite closely related. As an example, the $\Delta E$ difference between the 2000 and 5000 mg/dl glucose levels of the previously described color blocks of the reference charts utilized in Examples I and II is about seven (7) $\Delta E$ units. The values following are the average ($\bar{X}$) $L^*$ and $\Delta E$ values for the pairs.

| Strip Pair Color | $\bar{X} L^*$ | $\Delta E$ |
| --- | --- | --- |
| Light Tan | 80.5 | 3.3 |
| Pink | 63.8 | 1.8 |
| Brown | 40.0 | 3.9 |
| Blue | 39.1 | 3.9 |
| Dark Blue | 27.5 | 1.9 |

Mean $L^*$ values for the background preferred by the observers were obtained by averaging the $L^*$ values of the one background of each pair which was preferred by the readers.

| Strip Pair Color | $\bar{X} L^*$ of Strip Pair | Preferred Bkgrd, $\bar{X} L^*$ | Preferred Bkgrd, $L^*$ |
| --- | --- | --- | --- |
| Light Tan | 80.5 | 76.2 | 80.6 |
| Pink | 63.8 | 66.8 | 80.6 |
| Brown | 40.0 | 51.9 | 41.0 |
| Blue | 39.1 | 55.1 | 41.0 |
| Dark Blue | 27.5 | 41.0 | 41.0 |

$L^*$ values of the background were most frequently cited as best.

The foregoing results show that for each colored (strip) pair, the observers preferred backgrounds within the scope of the present invention, i.e., within 30 $L^*$ units of the average $L^*$ value of the colored pair.

Example V

A study was conducted to still further confirm the findings, discussed herein, that visual perception of very slight hue differences is substantially aided by selection of an appropriate background luminance ($L^*$) value within the range of from about 15 to about 80, and preferably within about 10 $L^*$ units of the average of the $L^*$ values of the colors being compared against the background. The $L^*$ values of the three backgrounds selected for this experiment were as follows:

| Background | $L^*$ |
| --- | --- |
| White | 94.7 |
| Gray | 30.8 |
| Black | 19.4 |

Two medium brown colors were then selected which had essentially the same $L^*$ values, 33.7 and 33.8, but very slightly differing hues, $\Delta E=4.6$. Ten (10) observers were selected at random and asked to select the one background which, in their judgment, afforded the best differentiation between the two colors when observed against the background. Nine of the ten observers selected the gray background ($L^*=30.8$), a background having an $L^*$ within 10 $L^*$ units of the average (33.75) $L^*$ value of the two colors. This result further indicates the enhancement of visual perception of sightly differing hues afforded by the invention for the clear majority of human observers.

Although embodiments of the present invention have been described and shown with a certain degree of particularity, it will be appreciated that various modifications can be made to the specific disclosure hereof without departing from the spirit and scope of the invention, as solely defined by the following claims.

What is claimed is:

1. A color comparison reference standard comprising a plurality of colored reference areas of differing hues corresponding to discrete reference values and to which a colored response area of a colorimetric test means can be compared to determine the reference value most closely related to the hue of the colored response area, and a background area against which said colored reference areas are displayed, said background area having a luminance ($L^*$) value of from about 15 to about 80, the luminance ($L^*$) value of any portion of said background area being within about 30 of the average luminance ($L^*$) value of any two or more adjacent ones of said colored reference areas which are displayed against said portion of said background area.

2. The color comparison reference standard of claim 1, wherein the luminance ($L^*$) value of any portion of said background area is within about 20 of the average luminance (L*) value of any two or more adjacent ones of said colored reference areas which are displayed against said portion of said background area.

3. The color comparison reference standard of claim 1, wherein the luminance (L*) value of any portion of said background area is within 10 of the average luminance (L*) value of any two or more adjacent ones of said colored reference areas which are displayed against said portion of said background area.

4. The color comparison reference standard of claim 1, wherein said plurality of colored reference areas and said background area are printed upon a paper substrate.

5. The color comparison reference standard of claim 4, wherein said paper substrate has an adhesive backing.

6. Color matching apparatus comprising a substrate, a colored background area upon said substrate having a luminance (L*) value of from about 15 to about 80, and a plurality of colored areas of differing hues displayed against said background area, said background area further having a luminance (L*) value within about 30 of the average luminance (L*) value of any two adjacent ones of said colored areas.

7. The apparatus of claim 6 wherein said substrate is paper.

8. In a color comparison chart comprising a plurality of colored reference standards for comparing a color response produced by an colorimetric analytical test thereto, the improvement wherein said chart further comprises a background against which said colored reference standards are displayed, said background having a luminance (L*) value of from about 15 to about 80 and within about 30 luminance (L*) units of the average luminance (L*) value of any two adjacent colored reference standards.

9. The improved color comparison chart of claim 8, wherein said background of said chart further comprises a color gradient varying from one portion to another thereof such that each of said portions of said background has a luminance (L*) value within about 20 luminance (L*) units of the average luminance (L*) value of any two adjacent colored reference standards.

10. The improved color comparison chart of claim 8, wherein said background of said chart further comprises a color gradient varying from one portion to another thereof such that each of said portions of said background has a luminance (L*) value within about 10 luminance (L*) units of the average luminance (L*) value of any two adjacent colored reference standards.

11. A method for distinguishing differences in hues of a plurality of colors, which method comprises displaying said colors against a colored background having a luminance (L*) value of from about 15 to 80 and within about 30 luminance (L*) units of the average luminance (L*) value of any two or more adjacent ones of said colors, viewing said adjacent colors displayed against said background and determining the extent of visually perceptible hue differences between said colors.

12. The method of claim 11, further comprising the steps of displaying a third color proximate to said adjacent ones of said colors and determining the extent of visually perceptible hue differences between said third color and said adjacent colors.

13. A method for matching colors comprising the steps of displaying a color to be matched adjacent one or more of the colored areas of color matching apparatus comprising a substrate, a colored background area upon said substrate having a luminance (L*) value of from about 15 to about 80, and a plurality of colored areas of differing hues displayed against said background area, said background area further having a luminance (L*) value within about 30 of the average luminance (L*) value of any two adjacent ones of said color areas and comparing against said background area of such apparatus the hue of said color to be matched and the hues of the colored areas of said apparatus.

* * * * *